US012059388B1

(12) United States Patent
Stuart

(10) Patent No.: US 12,059,388 B1
(45) **Date of Patent: *Aug. 13, 2024**

(54) CARRIER FOR CARRYING A CONTAINER OF MEDICALLY USEFUL SOLUTION OR SUSPENSION

(71) Applicant: Vickie Stuart, Hattiesburg, MS (US)

(72) Inventor: Vickie Stuart, Hattiesburg, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/217,197

(22) Filed: Jun. 30, 2023

Related U.S. Application Data

(63) Continuation of application No. 17/882,533, filed on Aug. 6, 2022, now Pat. No. 11,737,953, which is a continuation of application No. 16/839,193, filed on Apr. 3, 2020, now Pat. No. 11,446,207.

(60) Provisional application No. 62/840,447, filed on Apr. 30, 2019.

(51) Int. Cl.
*A61J 1/16* (2023.01)
*A61J 1/12* (2006.01)

(52) U.S. Cl.
CPC . *A61J 1/16* (2013.01); *A61J 1/12* (2013.01); *A61J 2200/42* (2013.01); *A61J 2200/44* (2013.01); *A61J 2200/50* (2013.01); *A61J 2200/72* (2013.01)

(58) Field of Classification Search
None
See application file for complete search history.

(56) References Cited

U.S. PATENT DOCUMENTS

| | | | | |
|---|---|---|---|---|
| 4,090,514 | A | 5/1978 | Hinck et al. | |
| 4,804,367 | A | 2/1989 | Smith | |
| 5,295,964 | A | 3/1994 | Gauthier | |
| 5,505,708 | A | 4/1996 | Atkinson | |
| 6,135,989 | A | 10/2000 | Atad et al. | |
| 9,669,986 | B1 * | 6/2017 | Evans | A45C 11/20 |
| 2009/0145793 | A1 * | 6/2009 | Hyde | A61B 50/30 220/592.2 |
| 2017/0292757 | A1 * | 10/2017 | Weaver | A61J 1/165 |
| 2018/0317619 | A1 * | 11/2018 | Caruth | A61J 7/0084 |

* cited by examiner

*Primary Examiner* — Adolf Dsouza
(74) *Attorney, Agent, or Firm* — BUSINESS PATENT LAW, PLLC

(57) ABSTRACT

A supple carrier for carrying a container of medically useful solution or suspension. The supple carrier includes a first monitoring window providing a first visualization perspective of the container contained by the envelope and one or more adjustable pressurizers. The supple carrier can delay the temperature change of the medically useful solution or suspension carried by the carrier.

20 Claims, 5 Drawing Sheets

CARRIER FOR CARRYING A CONTAINER OF MEDICALLY USEFUL SOLUTION OR SUSPENSION

PRIORITY

Applicant claims priority to Nonprovisional application Ser. No. 17/882,533—Carrier for Carrying a Container of Medically Useful Solution or Suspension—filed Aug. 6, 2022, that claims priority to Nonprovisional application Ser. No. 16/839,193—Carrier for Carrying a Container of Medically Useful Solution or Suspension —, filed Apr. 3, 2020 (now U.S. Pat. No. 11,446,207, granted Sep. 20, 2022) that claims the benefit of US Provisional Application 62/840,447—Enclosure for Carrying a Container Containing Medically Useful Solution or Suspension—filed Apr. 30, 2019.

BACKGROUND OF THE INVENTION

A. Field of the Invention

Among other things, the present invention is a carrier for carrying a medical container of solution or suspension used for treating a patient. The current carrier is particularly suited for delaying change in temperature of solution or suspension after the medical container is inserted into the envelope of the carrier.

B. Description of the Previous Art

Any discussion of references cited in this Description of the Previous Art merely summarizes the disclosures of the cited references and Applicant makes no admission that any cited reference or portion thereof is relevant prior art. Applicant reserves the right to challenge the accuracy, relevancy and veracity of the cited references.

References that may indicate a state-of-the-art for the current invention include 1) U.S. Pat. No. 5,295,964-Gauthier; 2) U.S. Pat. No. 4,804,367-Smith; 3) U.S. Pat. No. 5,505,708-Atkinson; 4) U.S. Pat. No. 6,135,989-Atad, et al.; and 5) U.S. Pat. No. 4,090,514-Hink, et al.

Among other things, the above references do not disclose a carrier for carrying a container containing medically useful solution or suspension; the carrier comprising: a) an envelope adapted to receive the container; the envelope comprising an inward layer, an outward layer, a thermal insulator, a fold and a fastener adapted to secure closure of the fold; b) a first monitoring window positioned on the envelope and providing a first visualization perspective of the container contained by the envelope; the first monitoring window extending from about a first lengthwise side to about the second lengthwise side of the envelope; and c) one or more adjustable pressurizers circumscribing the outward layer; each pressurizer adapted to apply pressure to the outward layer, thereby controlling pressure applied to the container.

SUMMARY OF THE INVENTION

Prior to the current invention, it is believed there were no supple carriers in the prior art for carrying a container of medically useful solutions or suspensions, where the supple containers were capable of significantly delaying change in the temperature of the solutions or suspensions. Meeting a long felt but unfilled need, the present invention provides a supple carrier that delays a change in temperature of a solution or a suspension after the medical container of solution or suspension is inserted into the carrier's envelope. It is believed that the current invention can assist in maintaining patient temperatures at approximately normothermia. Medical studies suggest that improved stability of the temperatures of solutions or suspensions delivered intravenously to the patient lessen the potential for infections and adverse events, and can improve patient outcomes associated with intravenous therapies.

An aspect of the present invention is to provide a supple carrier.

Still another aspect of the present invention is to provide a carrier capable of securing a container of medically useful solution or suspension.

It is still another aspect of the present invention to provide a carrier including one or more folds that control egress or ingress of the container carrying solution or suspension.

Yet another aspect of the present invention is to provide a supple carrier that includes thermal insulating material(s).

Still another aspect of the present invention is to provide a supple carrier that utilizes one or more pressurizers.

It is still another aspect of the present invention to provide a supple carrier that is functional with any IV-type support poll, wheelchair extension, gurney extension, hospital bed extension or any other apparatus capable of suspending the supple enclosure.

Yet another aspect of the present invention is to provide a supple carrier that includes antimicrobials.

A preferred embodiment of the current invention can be described as a carrier for carrying a container of medically useful solution or suspension; the carrier comprising: a) an inward layer and an outward layer forming an envelope adapted to receive the container; the envelope further comprising: i) a receptacle for the container; ii) an antimicrobial composition; and iii) a thermal insulator sandwiched between the inward layer and the outward layer; b) a superior opening and an opposed inferior opening, wherein at least one of the opposed openings is adapted for ingress or egress of the container; c) a superior section of the envelope extending beyond the superior opening; the superior section creating a superior fold adapted to control access to the superior opening, wherein an inward side of the superior fold comprises a first part of a first hook and loop fastener component; d) an inferior section of the envelope extending beyond the inferior opening; the inferior section creating an inferior fold adapted to control access to the inferior opening, wherein an inward side of the inferior fold comprises a first part of a second hook and loop component; e) hook and loop fastener segments positioned on the outward layer proximate the first and second openings; the hook and loop fastener segments adapted to engage their corresponding first parts of the hook and loop fastener components such that the combination of the folds, the first and second parts of the hook and loop fastener and the hook and loop fastener segments secures the container within the envelope; f) a first monitoring window providing a first visualization perspective of the container contained by the envelope; the first monitoring window extending from about the superior fold to about the second inferior fold; g) a second monitoring window providing a second visualization of the container; the second monitoring window proximate the first fold and adapted to receive markings; h) one or more adjustable pressurizers circumscribing the outward layer; each pressurizer adapted to apply pressure to the outward layer, thereby controlling pressure applied to the container; and i) a pliable handle attached to the outward layer.

Another preferred embodiment of the current invention can be described as a carrier for carrying a container of medically useful solution or suspension; the carrier comprising: a) an inward layer and an outward layer forming an envelope receiving the container, wherein the envelope further comprises a thermal insulator sandwiched between the inward layer and the outward layer; b) a first opening and an opposed second opening, wherein at least one of the openings is adapted for ingress or egress of the container; c) a first section of the envelope extending beyond the first opening creating a first fold adapted to control access to the first opening, wherein an inward side of the first fold comprises a first part of a first fastener; d) an second section of the envelope extending beyond the second opening creating a second fold adapted to control access to the second opening, wherein an inward side of the second fold comprises a first part of a second fastener; e) second parts of the first and second fasteners, positioned on the outward layer proximate the first and second openings, adapted to engage the first parts of the first and second fasteners, wherein engagement of the first parts and the first parts of the first and second fasteners secure the container within the envelope; f) a first monitoring window providing a first visualization perspective of the container contained by the envelope; the first monitoring window extending from about the first fold to about the second fold; g) one or more adjustable pressurizers circumscribing the outward layer; each pressurizer adapted to apply pressure to the outward layer, thereby controlling pressure applied to the container; and h) a pliable handle attached to the outward layer.

Yet another preferred embodiment of the current invention can be described as a carrier for carrying a container of medically useful solution or suspension; the carrier comprising: a) an envelope adapted to receive the container; the envelope comprising an inward layer, an outward layer, a thermal insulator, a fold and a fastener adapted to secure closure of the fold; b) a first monitoring window positioned on the envelope and providing a first visualization perspective of the container contained by the envelope; the first monitoring window extending from about a first lengthwise side to about the second lengthwise side of the envelope; and c) one or more adjustable pressurizers circumscribing the outward layer; each pressurizer adapted to apply pressure to the outward layer, thereby controlling pressure applied to the container.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

In the most general sense, the present invention is an enclosure adapted to carry a container. Among other things, the current enclosure includes thermal insulating material capable of delaying the change in temperature of medically useful US Food and Drug Administration (FDA) approved solutions or suspensions carried by the enclosure. The present supple enclosure is particularly useful for carrying pliable containers of intravenous solutions or suspensions. In accordance with the present invention, the containers enclosed by the supple envelope contain medically useful solutions or suspensions approved by the United States Food and Drug Administration.

Figure 1:
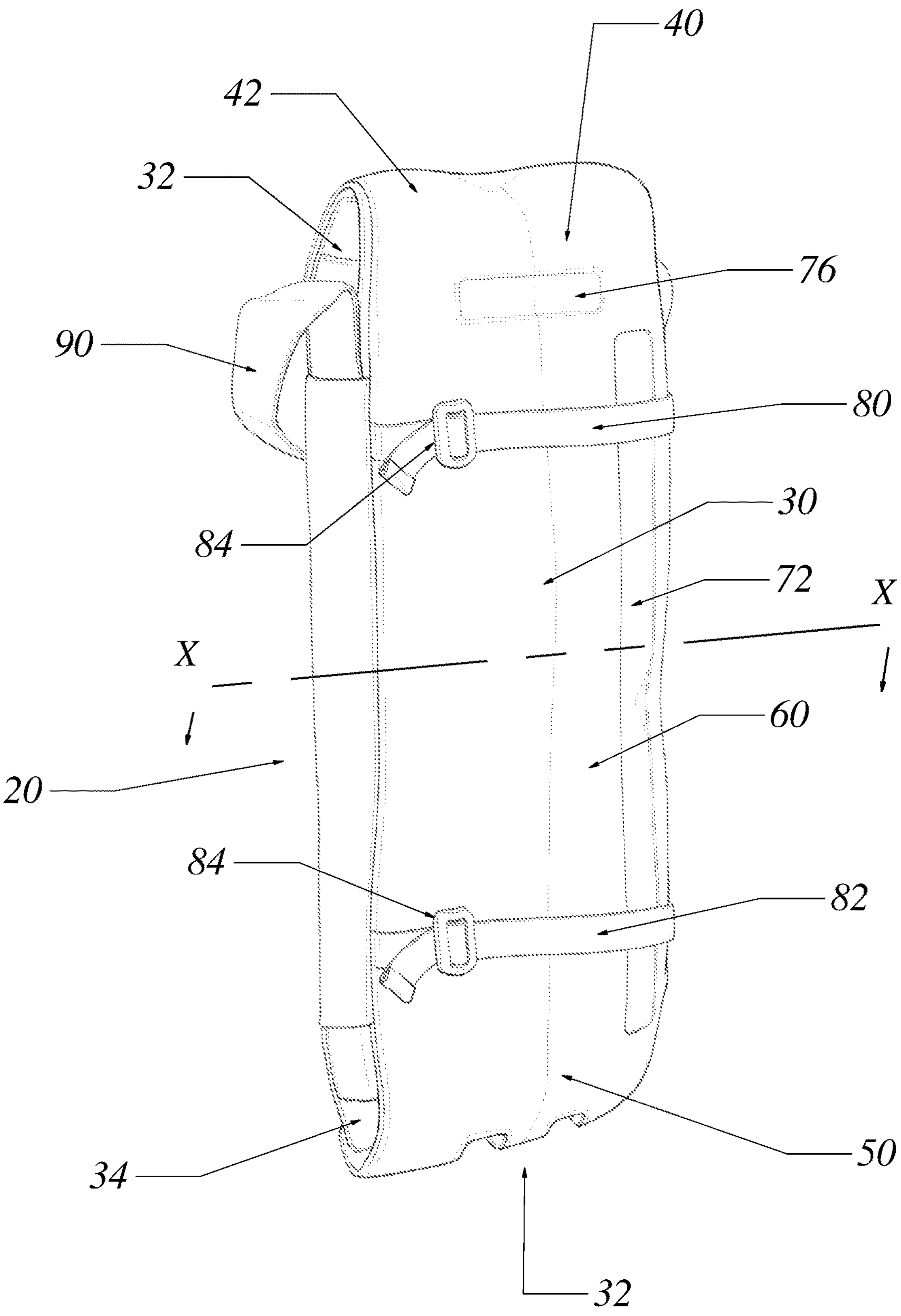
FIG. 1 is an anterior side perspective of supple carrier (20).

FIG. 1 is an anterior side perspective of supple carrier (20).

Figure 2:
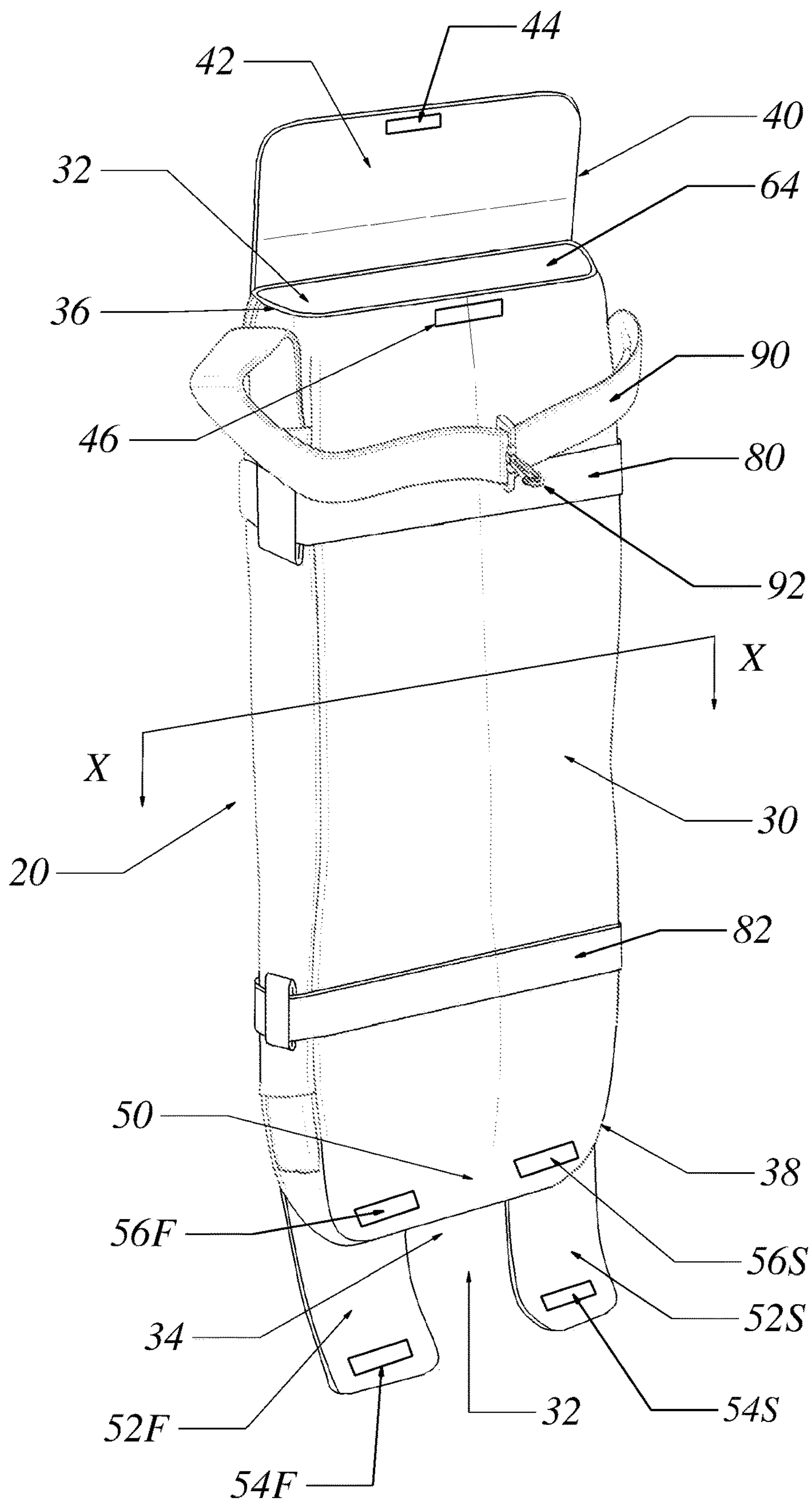
FIG. 2 is a posterior side perspective of supple carrier (20) with folds (42, 52) open to expose receptacle (64).

FIG. 2 is a posterior side perspective of supple carrier (20) with folds (42, 52) open to expose receptacle (64).

Figure 3:
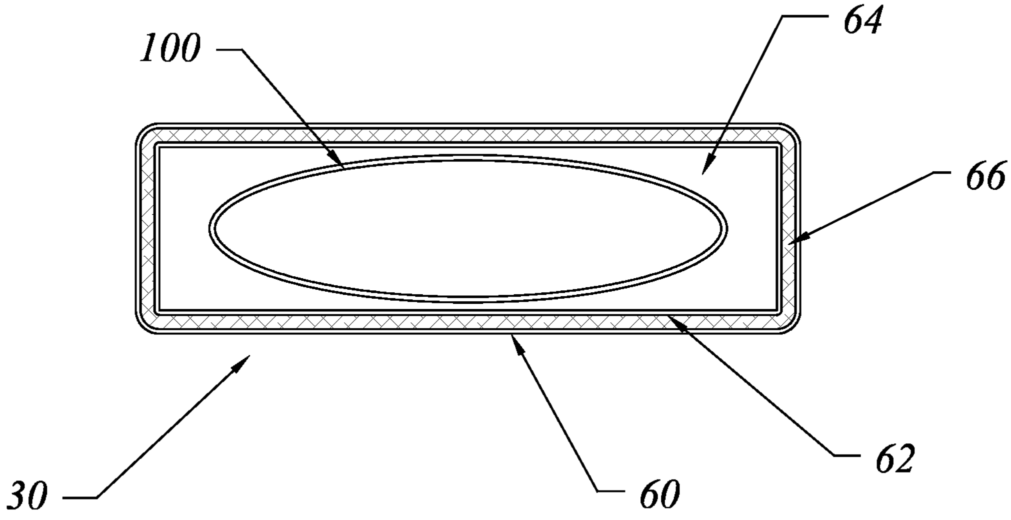
FIG. 3 is a cross-section of FIG. 1 along axis X-X disclosing, among other things, inward layer (62), outward layer (60) and thermal insulator (66).

FIG. 3 is a cross-section of FIG. 1 along axis X-X disclosing, among other things, inward layer (62), outward layer (60) and thermal insulator (66).

Figure 4:
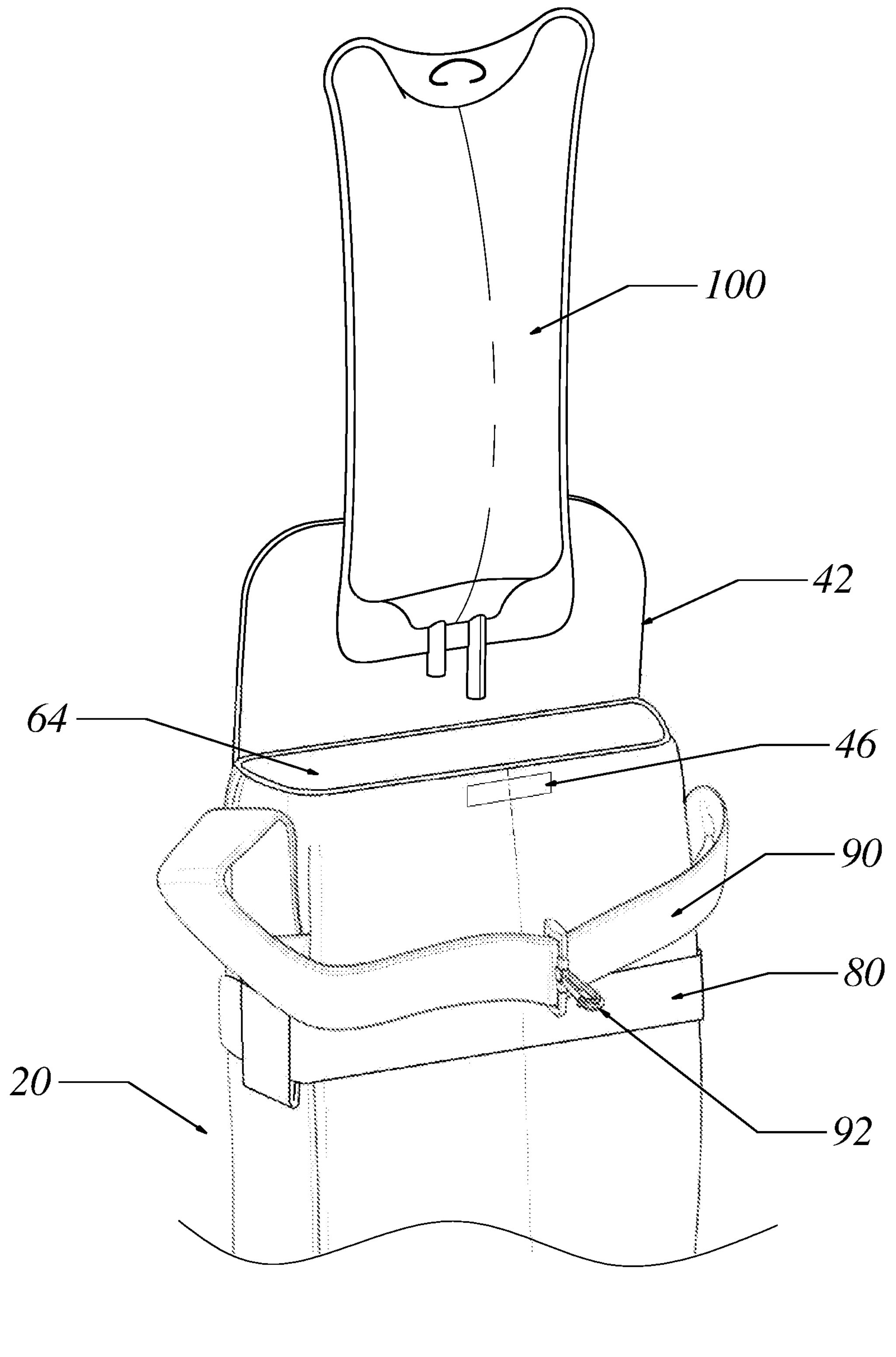
FIG. 4 is an exploded view of container (20) portraying egress/ingress of container (100) into or out of receptacle (64).

FIG. 4 is an exploded view of container (20) portraying egress/ingress of container (100) into or out of receptacle (64).

Figure 5:
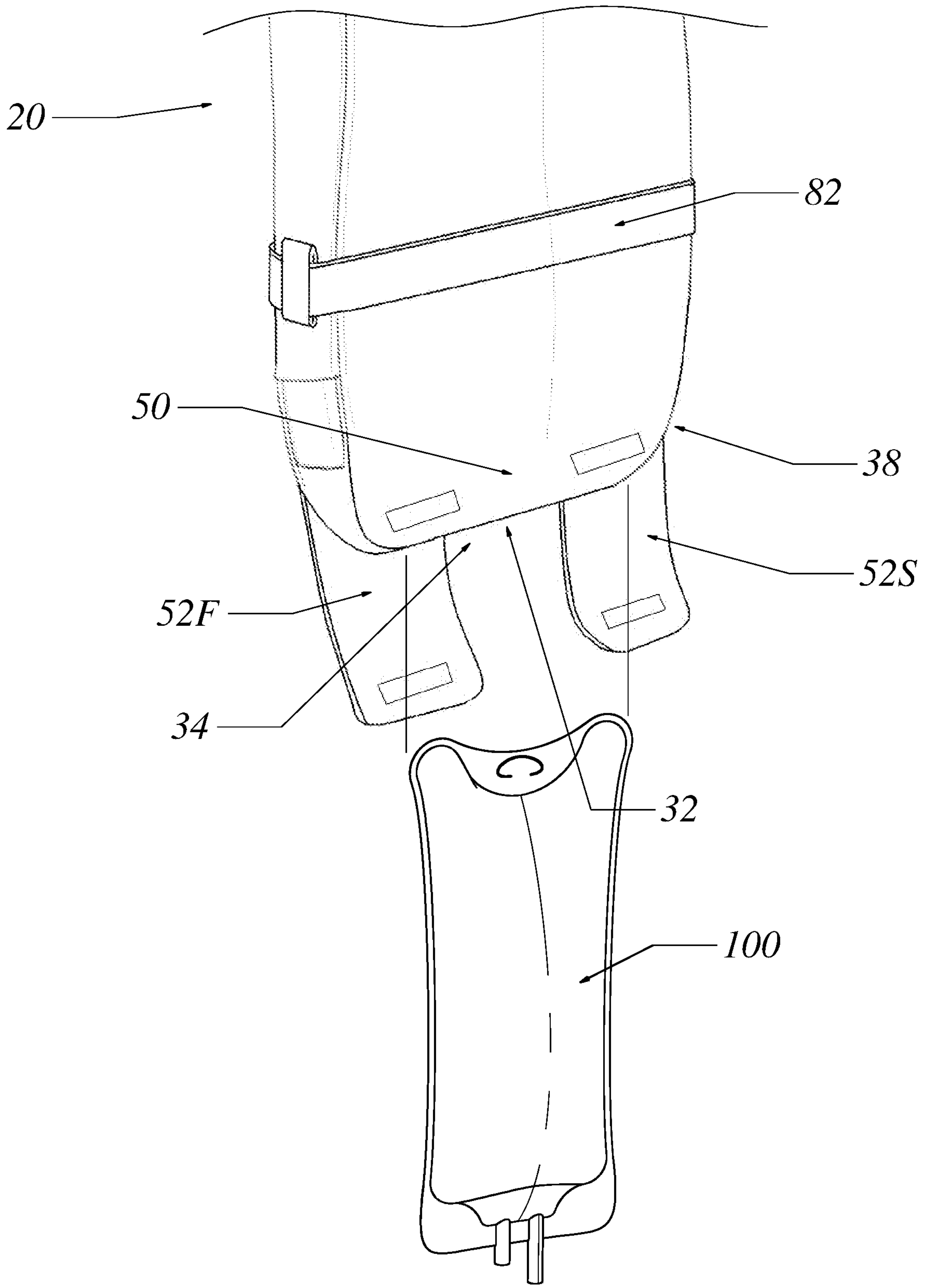
FIG. 5 is another exploded view of container (20) portraying egress/ingress of container (100) into or out of receptacle (64).

FIG. 5 is another exploded view of container (20) portraying egress/ingress of container (100) into or out of receptacle (64).

Carrier (20) includes envelope (30) adapted to receive and carry the container (100) of medically useful suspension or suspension. By way of illustration and not limitation, container (100) can be flexible IV bag. Envelope (30) is provided first or superior opening (32) and a second or inferior opening (34). Openings (32, 34) allow for ingress or egress of container (100).

First or superior section (40) of envelope (30) extends beyond first opening (32) and creates first fold (42) that can be folded over first opening (32) to control ingress or egress from first opening (32). Inward side of fold (42) can be provided with first part of first fastener component (44) adapted to engage second part of first fastener component (46) associated with first segment (36) proximate first opening (32). Although shown with first fold (42), carrier (20) is functional when the first fold (42) is eliminated and fastener means is attached to the first segment secure closure of opening (64).

Second or inferior section (50) of envelope (30) extends beyond second opening (34) and creates second fold (52) including tabs (52F, 52S) that can be folded over second opening (34) to control ingress or egress from second opening (34). Inward side of fold (52) can be provided with first part of second fastener component (54F, 54S) adapted to engage second part of second fastener component (56F, 56S) associated with second segment (38) proximate second opening (34). Although shown with tabs (52F, 52S), carrier (20) is functional when using a single tab (52F) that includes only second fastener components (54F, 56F).

Examples of acceptable fasteners components (44, 46, 54F, 54S, 56F, 56S) include hook and loop, snap or any other fastener acceptable in the art. The combination of folds (42, 52) and fasteners (44, 46, 54F, 54S, 56F, 56S) secures container (100) within envelope (30).

FIG. 3 is a cross-section of FIG. 1 along axis X-X disclosing, among other things, inward layer (62), outward layer (60) and thermal insulator (66).

Supple envelope (30) is manufactured from any type of fabric, webbing or weaves acceptable in the art. Envelope (30) includes outward layer (60) and inward layer (62) of a fabric surrounding receptacle (64) that receives container (100). In select preferred embodiments, envelope is provided with a thermal insulator (66) sandwiched between outward layer (60) and inward layer (62). Thermal insulator (66) can consist of any thermal insulation approved by the appropriate United States regulatory body and acceptable in the art.

Depending on the medical condition of the patient infused with the medically useful solution or suspension, the medically useful solution or suspension can be presented to the patient at normothermic temperature or temperatures greater or less than normothermic. After container (100) containing the medically useful solution or suspension is inserted into receptacle (64) of carrier (20), the envelope (30) including the thermal insulator (66) delays an increase or decrease in temperature of the medically useful solution or suspension. It has been determined that the combination of envelope (30) and thermal insulator (60) can delay change in temperature of the medically useful solution or suspension to the ambient temperature of a patient's surrounding environment from about 60 minutes to about 120 minutes. In select preferred embodiments of carrier (20), folds (42, 52) can also include thermal insulator (66).

Carrier (20) is provided first monitoring window (72). Monitoring window (72) provides a first visualization perspective of container (100) carried by envelope (30). In select preferred embodiments of envelope (30), first monitoring window (72) extends from about superior fold (42) to about second inferior fold (52). Carrier (20) can also include second monitoring window (76), where second monitoring window (76) is proximate first fold (42) and adapted to receive markings applied by the user of carrier (20). Monitoring windows (72, 76) are manufactured from transparent or translucent materials acceptable in the art.

In accordance with the current invention, gravity, in part, can direct the flow of the medically useful solution or suspension contained in the container toward the intravenous site. However, as enabled below, preferred embodiments of supple carrier (20) can be provided with one or more pressurizers (80, 82).

As shown in FIGS. 1 and 2, first pressurizer (80) and second pressurizer (82) circumscribe the outward layer (60) of envelope (30). First and second pressurizers (80, 82) can be in the form of adjustable bands or straps. First and second pressurizers (80, 82) can include lockable adjustable grippers (84) that allow the bands or straps to apply different pressures to the outward layer (60), thereby controlling pressure applied to container (100). By way of illustration and not limitation, grippers (84) can include such things as clasps, buckles, sliders or other locking devices acceptable in the art.

Carrier (20) can be provided with pliable handle (90). Select preferred embodiments of pliable handle (90) are provided with a hanger device (92) for engaging a fixed or mobile supports such as any IV-type support poll, wheelchair extension, gurney extension, hospital bed extension or any other apparatus (not shown) capable of suspending supple carrier (20) above the intravenous site. Those skilled in the art recognize that an intravenous site is a medically prepared field on the patient for receiving a medically useful solution or suspension.

Within the scope of the present invention, antimicrobials can be incorporated into inward layer (62), outward side (60) and/or thermal insulator (66). Select preferred antimicrobials can include ions of silver or zinc as well as salts of silver and zinc or any other antimicrobial composition acceptable in the art.

Applicant has enabled, described and disclosed the invention as required by Title 35 of the United States Code.

What is claimed is:

1. A carrier for carrying a container of medically useful solution or suspension; the carrier comprising: an envelope adapted to receive the container; the envelope comprising an inward layer, an outward layer, a thermal insulator, a fold, a fastener, adapted to secure closure of the fold and a first monitoring window positioned on the envelope providing a first visualization perspective of the container contained by the envelope; the first monitoring window extending from about a first lengthwise side to about the second lengthwise side of the envelope.

2. The carrier of claim 1 comprising one or more adjustable pressurizers circumscribing the outward layer; each pressurizer adapted to apply pressure to the outward layer, thereby controlling pressure applied to the container.

3. The carrier of claim 2, wherein the one or more adjustable pressurizers comprise an adjustable lockable gripper.

4. The carrier of claim 3, wherein the fastener comprises hook and loop segments, snaps or a combination thereof.

5. The carrier of claim 4, wherein the thermal insulator is sandwiched between the inward and outward layers.

6. The carrier of claim 5 comprising a second fold.

7. The carrier of claim 6, wherein one or more of the inward and outward layers and the thermal insulator comprises an antimicrobial composition.

8. The carrier of claim 7 comprising:

a) a pliable handle attached to the outward layer; and b) a second monitoring window providing a second visualization of the container; the second monitoring window proximate a lengthwise side and adapted to receive markings.

9. A carrier for carrying a container of medically useful solution or suspension comprising an envelope adapted to receive the container; the envelope comprising an inward layer, an outward layer, a thermal insulator, a fold, a fastener adapted to secure closure of the fold and a first monitoring window positioned on the envelope providing a first visualization perspective of the container contained by the envelope.

10. The carrier of claim 9 comprising one or more adjustable pressurizers circumscribing the outward layer; each pressurizer adapted to apply pressure to the outward layer, thereby controlling pressure applied to the container.

11. The carrier of claim 10, wherein the fastener comprises hook and loop segments, snaps or a combination thereof.

12. The carrier of claim 11, wherein the thermal insulator is sandwiched between the inward and outward layers.

13. The carrier of claim 12 comprising a second fold.

14. The carrier of claim 13, wherein one or more of the inward and outward layers and the thermal insulator comprises an antimicrobial composition.

15. The carrier of claim 14 comprising:

a) a pliable handle attached to the outward layer; and b) a second monitoring window providing a second visualization of the container; the second monitoring window proximate a lengthwise side and adapted to receive markings.

16. A carrier for carrying a container of medically useful solution or suspension comprising an envelope, a thermal insulator, one or more folds, one or more fasteners adapted to secure the one or more folds and a first monitoring window positioned on the envelope providing a first visualization perspective of a container contained by the envelope.

17. The carrier of claim 16, wherein the thermal insulator is between an inward and outward layer of the envelope.

18. The carrier of claim 17 comprising one or more adjustable pressurizers circumscribing the outward layer; each pressurizer adapted to apply pressure to the outward layer, thereby controlling pressure applied to the container.

19. The carrier of claim 18, wherein one or more of the inward and outward layers and the thermal insulator comprises an antimicrobial composition.

20. The carrier of claim 19 comprising:

a) a pliable handle attached to the outward layer; and b) a second monitoring window providing a second visualization of the container.

* * * * *